Aug. 7, 1962 H. E. CLARY 3,048,022
COMPRESSOR CONTROL IN AUTOMOTIVE AIR CONDITIONING SYSTEM
Filed July 15, 1959 4 Sheets-Sheet 1

Inventor
Harry E. Clary
by Hill, Sherman, Meroni, Gross & Simpson Attys.

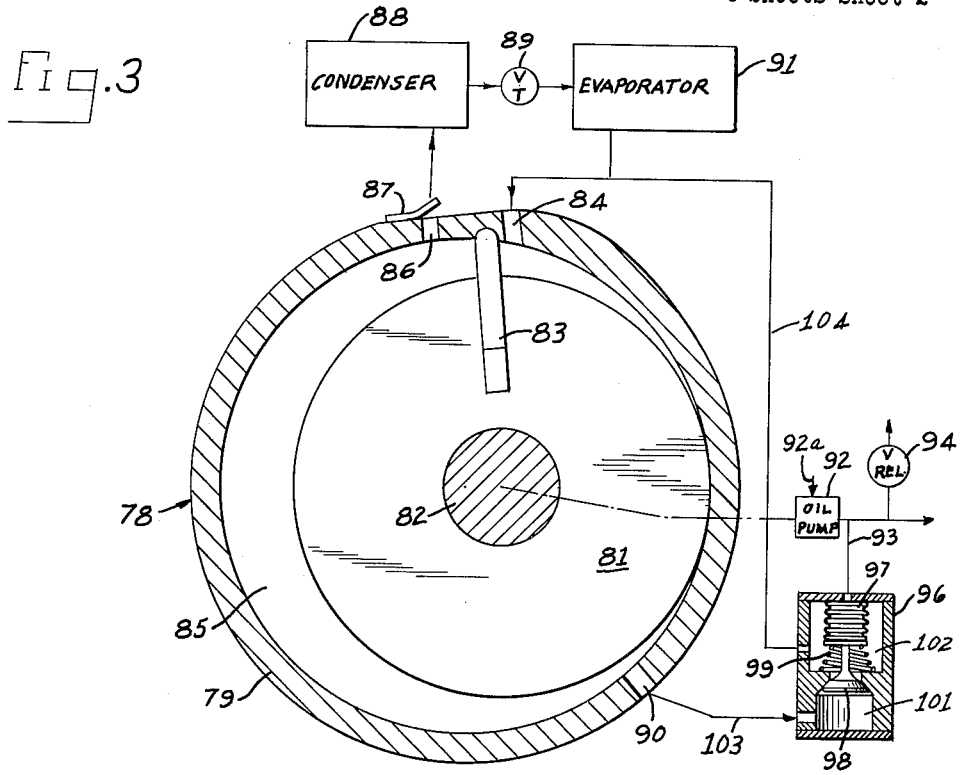
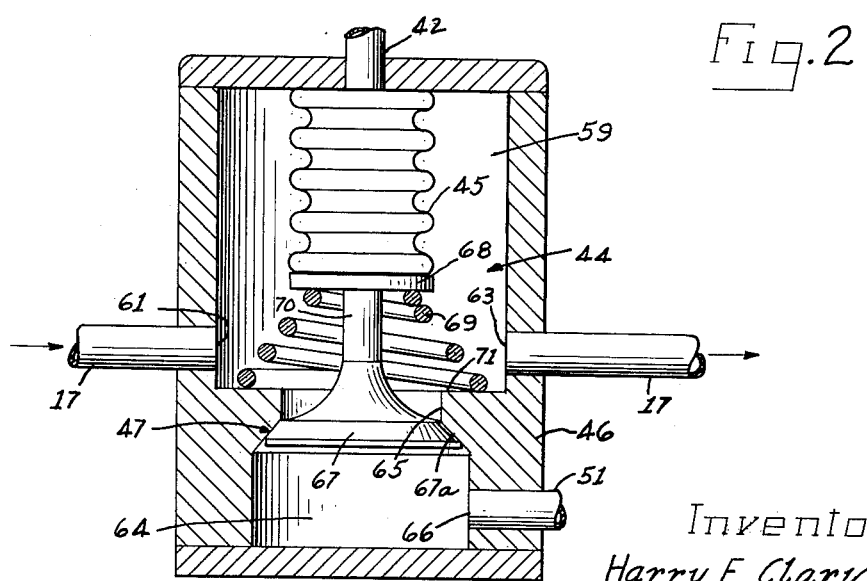

Inventor
Harry E. Clary
Attys

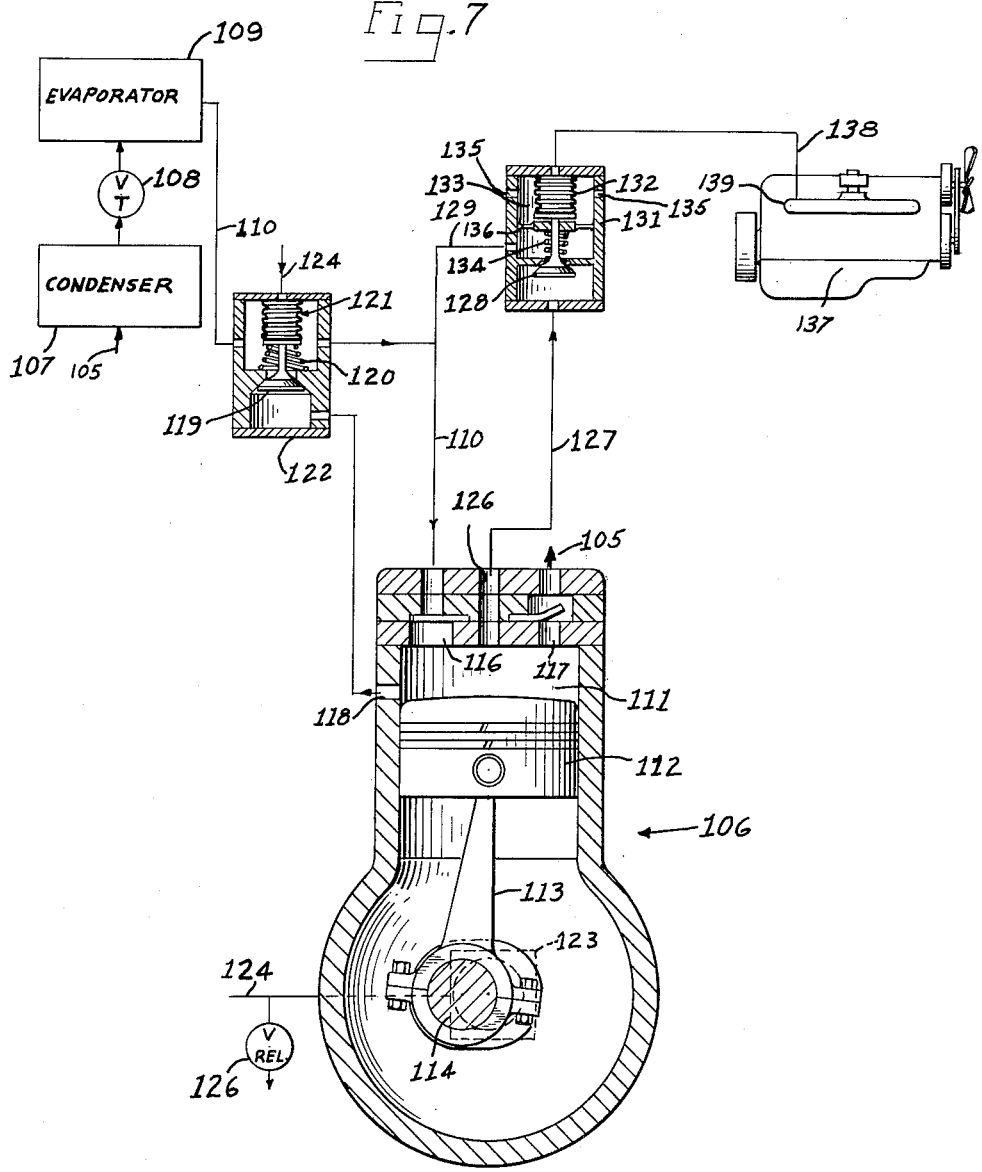

United States Patent Office 3,048,022
Patented Aug. 7, 1962

3,048,022
COMPRESSOR CONTROL IN AUTOMOTIVE AIR CONDITIONING SYSTEM
Harry E. Clary, Chesterland, Ohio, assignor to Thompson Ramo Wooldridge Inc., Cleveland, Ohio, a corporation of Ohio
Filed July 15, 1959, Ser. No. 827,203
13 Claims. (Cl. 62—116)

The present invention relates to improvements in compressors for automotive vehicle air conditioning systems and to improved apparatus and methods of controlling the compressors particularly for reducing the output at high speeds and at heavy loads of the engine driving the vehicle and the compressor.

Automotive air conditioning compressors are conventionally driven from the engine in the vehicle so that the compressor speed varies over a wide range as the engine operates between idle speed and full speed. The capacity of compressors of this type increases with their speed and a compressor of adequate size to serve an air conditioner to cool the inside of an automobile at engine idle speeds and low road speeds is more than adequate in size at normal cruising speeds and at high speeds. This results in a waste of engine power and consequent reduction of efficiency and reduction in maximum engine power available to the vehicle at higher speeds and during periods of acceleration.

The present invention contemplates the provision of an improved method and apparatus for reducing the compressor load on the engine at a predetermined speed to conserve power, improve efficiency, and improve the operating characteristics of the air conditioning system. The present invention additionally contemplates providing improved methods and apparatus for reducing the compressor load on the engine when the vehicle is being rapidly accelerated, such as when passing on an open highway, and when the engine is under a heavy load.

Accordingly, an object of the present invention is to provide for reducing the load of an air conditioning compressor on an engine to some fraction to its normal value when the engine reaches a predetermined high speed and to reduce the compressor load on the engine to a fraction of its normal value or to zero when the engine is being rapidly accelerated or is under heavy load.

Another object of the invention is to provide an improved mechanism for supplying a control signal for reducing the compressor output, and the load on an engine, of an engine driven compressor, which is proportional to engine and to compressor speed.

Another object of the invention is to provide an improved control for an air conditioning compressor for reducing the compressor load which is operated by a pressure signal obtained from an oil pump driven by the compressor.

Another object of the invention is to provide an improved control for reducing the output of a compressor and the load of the compressor on an engine at high speeds, which operates as a function of the net oil pressure increase of an oil pump driven by the compressor, and measures intake oil pressure by measuring the pressure of the refrigeration fluid at the compressor intake.

Another object of the invention is to provide an improved mechanism for reducing the load of a compressor for an automotive air conditioning system as a function of the load and the acceleration of a vehicle engine.

A further object of the invention is to provide an improved mechanism for controlling the load of a compressor for an automotive air conditioning system on the engine of a vehicle as a function of the pressure in the intake manifold of the vehicle engine.

Other objects and advantages become more apparent with the teaching of the principles of the invention in the disclosure of the preferred embodiments thereof in the specification, claims and drawings, in which:

FIGURE 2 is a detailed sectional view of a control valve for a compressor incorporating the principles of the invention;

FIGURE 3 is a sectional view, shown partially in schematic form, of an air conditioning system employing a rotary compressor and embodying the principles of the invention;

As shown on the drawings:

Figure 1:
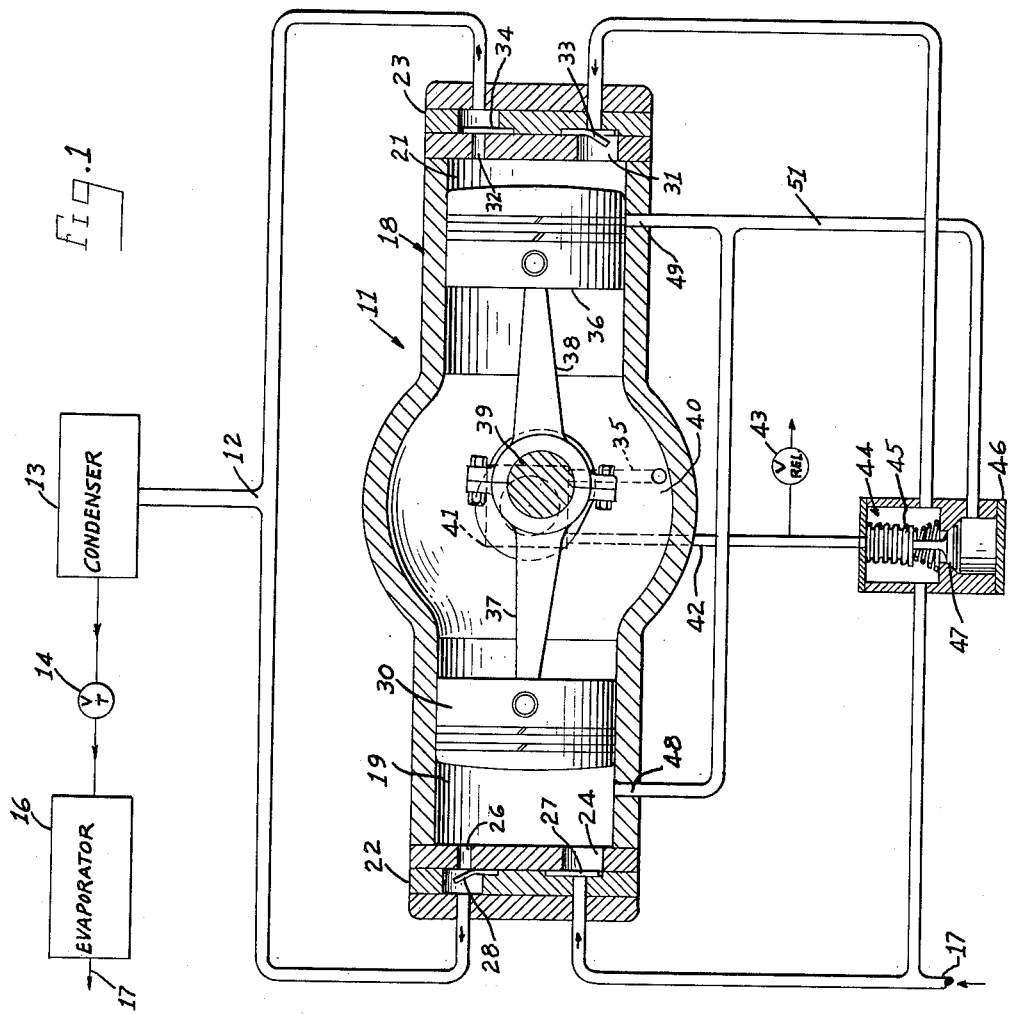
FIGURE 1 is a sectional view shown partially in schematic form of an air conditioner with a compressor embodying the principles of the present invention.

As illustrated in FIGURE 1, a compressor 11 discharges a compressed refrigeration or working fluid through a discharge line 12 which is connected to a condenser 13. The refrigerating fluid expands through a throttle valve 14 into an evaporator 16 which cools the occupancy spaces of an automotive vehicle for which the air conditioning system illustrated in FIGURE 1 is adapted. The refrigerating fluid returns from the evaporator 16 to the compressor through an inlet line 17.

The compressor is provided with means for reducing its output and consequently reducing the power required to drive it by the engine of the vehicle. The output is reduced as a function of the speed of the compressor, which is measured by the net increase in oil pressure of a pump driven by the compressor.

More particularly, controlled reduced output is obtained in a manner so that when the output is reduced a portion of the compressor output will be bypassed back to the inlet by a pressure controlled valve which operates in response to the difference in intake and discharge pressure of an oil pump driven by the compressor, and the inlet pressure of the oil pump is measured by compressor pressure at the inlet port of the compressor.

Figure 6:
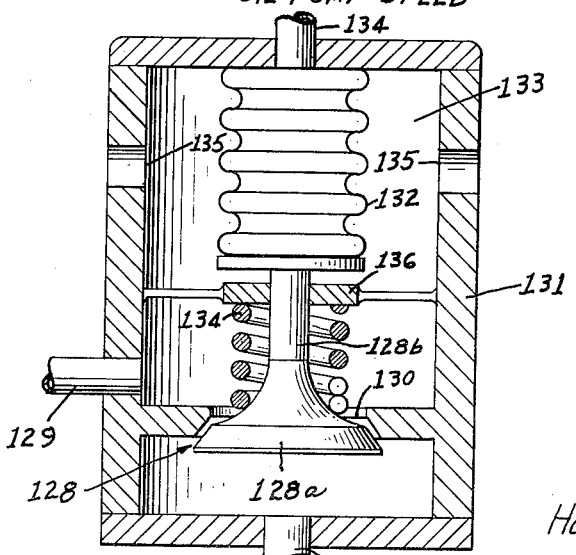
FIGURE 6 is an enlarged detailed sectional view showing a valve for controlling compressor output as a function of engine intake manifold pressure; and, FIGURE 7 is a sectional view shown partially in schematic form of an air conditioning system embodying further features of the invention.

In the form of FIGURE 6, the discharge of the compressor is not only relieved as a function of the speed of the compressor but also as a function of the load on an engine of a vehicle with which the air conditioning system is used or as a function of the acceleration of the engine. These latter functions are obtained in the preferred form illustrated, by a pressure signal from the intake manifold of the engine.

In the compressor 11 illustrated in FIGURE 1, a compressor housing 18 serves a dual discharge compressor and has a first compressor chamber 19 at one end of the housing and a second compressor chamber 21 at the other end of the housing. The chambers are closed by heads 22 and 23 which are suitably secured to the housing 18 and which carry the control valves for the inlet and discharge ports. The compressor chamber 19 has an inlet port 24 and a discharge port 26. An inlet check valve 27 serves the inlet port 24 and a discharge check valve 28 serves the discharge port 26. The other compressor chamber 21 has an inlet port 31 and a discharge port 32, with an inlet valve 33 and a discharge valve 34 respectively serving the ports.

The compressor chamber 19 is cylindrical in shape and slidably receives a compressor piston 30, with the cylindrical compressor chamber 21 slidably receiving a piston 36. The pistons are driven by piston rods 37 and 38 respectively, connected to a crank shaft 39 which is provided with suitable drive mechanism (not shown) such as a pulley in a belt being driven by the engine of the vehicle with which the compressor and air conditioning system are used.

The inlet ports 24 and 31 for the two compressor chambers are connected to the common inlet line 17 and the discharge ports 26 and 32 are connected to the common discharge line 12 for alternate operation of the compressor pistons as will be appreciated by those skilled in the art.

The crank shaft 39 is also connected to drive an oil pump 41 with an intake 35 connected to the crank chamber 40. The oil pump may be of any suitable type which has an output pressure that increases as a function of the speed of the compressor and which is suitable for providing lubricating oil for the compressor mechanism. An oil pressure line 42 is connected to the oil pump discharge and is provided with a pressure relief valve 43 that opens at a predetermined pressure to bleed oil back to the chamber 40. The pump 41 supplies a pressure signal to a control valve operating mechanism 44, shown as including a bellows 45. The bellows 45 is located within a valve housing 46 enclosing a control valve 47 and the function of the operating mechanism 44 and the valve 47 will be described in greater detail in connection with FIGURE 2. The valve housing 46 is connected to the inlet line 17 so that the valve operating mechanism 44 also operates as a function of the compressor inlet pressure, which is the pressure of the evaporator 16.

The compressor is relieved at increased engine and compressor speeds, in the preferred form illustrated, by compressor relieving ports 48 and 49 which open from the compressor chambers 19 and 21 at a location spaced from the compressor heads 22 and 23. While each of the pistons 30 and 36 are moving toward the heads in their discharge strokes and the relieving ports 48 and 49 are open, the fluid can escape back to the pump intake through a line 51 connected to the ports. Only after the pistons have passed the relieving ports 48 and 49 will refrigerating fluid be delivered by the compressor at a pressure to the air conditioning system. Thus the pistons are effective for only a portion of their stroke and the capacity of the compressor is reduced by an amount dependent upon the positioning of the relieving ports 48 and 49.

The relieving ports are controlled by the control valve 47 which either opens or closes the line 51 so as to permit it to bleed into the inlet line 17. In practice, the line 51 will be kept as short as possible to minimize reexpansion losses.

As illustrated primarily in FIGURES 1 and 2, the control valve 47 and the valve operator 44 are enclosed in the housing 46 which has an oil system pressure inlet port to which is connected the oil line 42 to pressurize the area within the bellows. The area 59 outside of the bellows is exposed to the inlet pressure of the compressor and for this purpose the valve housing has ports 61 and 63 which are connected to the inlet line 17 of the compressor. In the area 64 in the housing, the lower end of the valve housing 46 communicates through a valve port 65 with the area 59 to permit the flow of refrigeration fluid from the line 51 into the inlet line 17, with line 51 being connected to port 66 in the valve housing. The valve 47 has a poppet valve head 67 which coacts with a seat 67a and is mounted on a stem 70 connected to a plate 68 attached to the bellows 45. The force of the pressure in valve housing chamber 59 acts on the top surface of the valve head 67 and the lower surface of the bellows plate 68 and is substantially balanced.

The valve operator 44 includes a coil compression spring 69 seated on an annular shoulder 71 surrounding the valve port, and engaging the bellows plate 68, and holds the valve 47 closed until the oil pump pressure reaches a predetermined value at a predetermined compressor speed.

The valve 47 remains closed until the speed of the compressor reaches a point where the oil pressure force on the bellows 45 exceeds the force of the spring 69 at which time the valve opens to permit the compressor chambers to be relieved through the relieving ports 48 and 49.

Figure 4:
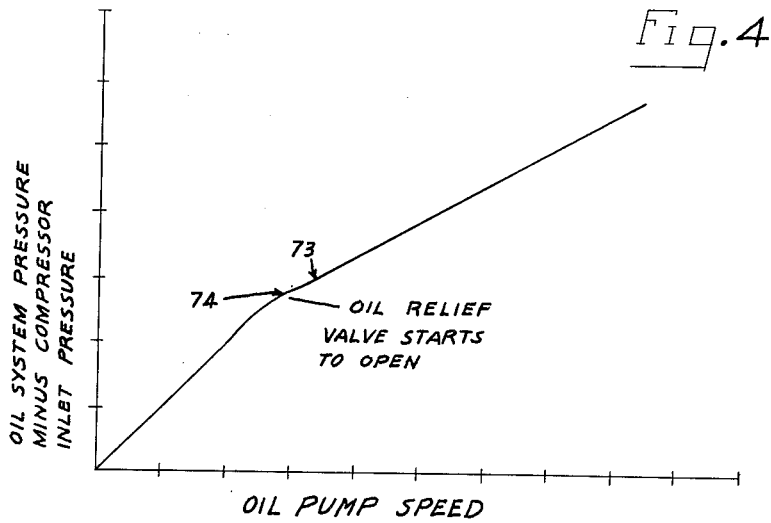
FIGURE 4 is a graph illustrating a curve of oil pump speed plotted against oil system pressure minus compressor inlet pressure for an oil pump driven by the compressor.

The inlet pressure to the oil pump 41 will be nearly equal to the compressor inlet pressure since the oil reservoir, shown generally at 40, is subjected to this pressure. This will vary as various factors influence the entire cooling system, for example, with changes in ambient temperature. Thus the difference between oil pump discharge pressure and compressor inlet pressure indicates the true increase in oil pressure across the pump 41 and this will be a reliable function of the speed of the compressor and the vehicle engine. If the relief valve 43, connected to the oil discharge line 42, is a simple spring loaded pressure relief valve, the oil pump discharge pressure measured between the oil pump and the pressure relief valve will still be a function of oil pump speed after the valve opens since this type of relief valve is sensitive to rate of flow as well as pressure. FIGURE 4 illustrates relationship between oil pump speed and oil system pressure minus compressor inlet pressure with operation of the oil relief valve 43.

The pressure curve 73 is substantially a straight line function and the slope changes at 74 when the oil relief valve starts to open. However, as may be seen from the curve the oil system pressure is still proportional to oil pump speed after the oil relief valve has opened.

Figure 5:
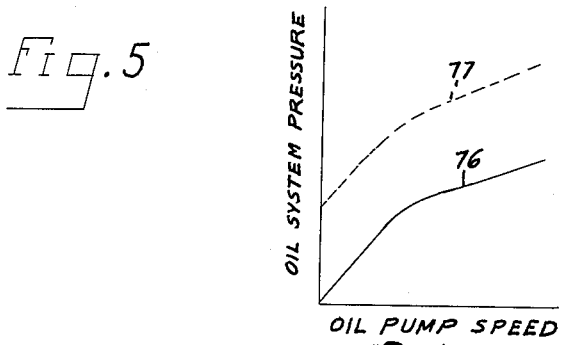
FIGURE 5 is a graph illustrating the curves of oil pump speed plotted against oil pump discharge pressure.

FIGURE 5 illustrates oil pressure system alone as plotted against oil pump speed and the curve 76 shows the pressure at a low compressor inlet pressure and hence a low oil pump inlet pressure. The broken line curve 77 shows what happens when the evaporator and pump inlet pressures increase, i.e., the output pressure also increases. Thus for accurate measurement the present system measures the rise in pressure across the pump, which is the output pressure minus the input pressure.

It will be seen that the control valve and operator which operate in accordance with the function of FIGURE 4, operate proportional to engine and compressor speed. This speed of course could be derived from other mechanical devices such as from the engine ignition system, from the engine oil system, from the engine cooling system, or by a mechanically driven device sensitive to speed, such as a centrifugal switch. Such a signal could be used to energize a solenoid operated valve that would bypass the working fluid in a manner similar to the valve described. The present preferred arrangement provides an inexpensive, efficient and reliable signal and the mechanism can be incorporated into a compact unit since it is operated at one location.

In FIGURE 3 the principles of the invention are embodied in an air conditioning system for an automotive vehicle and utilize a rotary compressor. The rotary compressor is illustrated at 78 with a housing 79 and a rotary piston 81 which is driven in an oscillating motion within the housing. A sealing vane 83 is pivotally mounted in the housing and slides in a slot in the rotor, separating a compressor inlet port 84 from a compressor discharge port 86. The rotary piston or rotor 81 forces working fluid from the inlet port 84 to the discharge port 86 as it oscillates in the compressor chamber 85 within the housing. The discharge port is provided with a check valve 87 and the ports are provided with suitable connections, with the discharge port connected to a condenser 88 which is connected to an expansion valve 89 which in turn connects to an evaporator 91. The evaporator connects back to the inlet port 84 of the compressor.

To reduce the capacity of the compressor, fluid is bypassed through a relieving port 90 which relieves the fluid forced ahead of the rotor during a first part of its discharge movement.

The compressor drives an oil pump 92 having an oil inlet 92a which is subjected to substantially the same pressure as the inlet of the compressor and the oil pump discharges to a pressure line 93 which is provided with a relief valve 94. The pump output pressure line 93 connects to a control valve housing 96 containing a control valve operator 97 in the form of a bellows, and also containing a control valve 98. The control valve 98 separates a lower chamber 101 and an upper chamber 102 in the valve housing 96 and at a predetermined oil pump pressure, indicative of a predetermined speed of the compressor, the valve 98 will be opened by the oil pressure operating the bellows 97 against a coil spring 99 to permit working fluid to be by-passed from the bypass line 103, which is connected to the bypass relieving port 90 to the line 104 connected back to the compressor inlet 84.

Compressor capacity and compressor load on the engine can be reduced at a predetermined speed, as disclosed above, as well as during heavy engine load conditions and the mechanism of FIGURES 6 and 7 illustrate a preferred embodiment wherein both may be accomplished. A single piston compressor 106, FIGURE 7, delivers working fluid through a line 105 to a condenser 107 which connects to an expansion valve 108 connected to an evaporator 109 which connects back to the compressor inlet through a line 110. The compressor has a compressing chamber 111 which is cylindrical in shape and slidably houses a compressing piston 112 driven by a piston rod 113 connected to a crank shaft 114. The compressing chamber 111 is ported by an inlet port 116 and a discharge port 117, and a bypass or relieving port 118 is provided in the wall of the compressor chamber 111. The relieving port 118 is controlled by a control valve 119 which is controlled by a valve operator shown in the form of a bellows 121 acting against a spring 120, all of which are located in a valve housing 122 and having the same construction shown in detail in FIGURE 2. An oil pump 123 is driven by the crank shaft 114 and an oil pressure line 124 connects to the valve operator bellows 121 and has connected to it a pressure relief valve 126 to reduce the output capacity of the compressor in the manner described above in connection with FIGURES 1, 2 and 4.

The compressor chamber 111 is provided with a second relief port 126 which is at the discharge end of the chamber 111 so that when the second port 126 is open the capacity of the compressor will be reduced to zero. A relieving line 127 is connected to the second relieving port 126 and is controlled by a control valve 128, FIGURES 6 and 7. When the valve 128 is open the relieving line 127 communicates with a line 129 which bypasses working fluid back to the inlet line 110 of the compressor. The valve 128 is shown as a poppet type with a head 128a coacting with a seat at the edge of the valve port 130, and is housed in a valve housing 131 which also contains a bellows valve operator 132. The area within the bellows is normally subjected to a vacuum and urges the valve 128 toward closed position. This force acts against the force of a coil compression spring 134 mounted on a support wall 136 and urging the valve 128 toward open position. The valve stem 128b is sealed as it passes through the support wall 136. The area 133 outside of the bellows is exposed to ambient air pressure through ports 135 in the housing 131.

The bellows is operated by a signal which is a function of the load on the engine of the vehicle with which the air conditioning system is used. The signal is supplied in the form of a pressure signal to line 138 which is connected to an intake manifold 139 of the engine 137 of the vehicle. If the engine throttle is suddenly opened to rapidly accelerate the vehicle or if the engine is under heavy load, the intake manifold absolute pressure will increase (the vacuum will decrease). This decrease in vacuum will open the valve 128 completely relieving the compressor 106 and removing its load from the engine 137. At higher vacuums which are encountered when the engine is not being accelerated or when the engine is operating under normal cruising load, the valve 128 will be closed and the compressor will operate normally.

If desired, the second bypass relieving port 126 may be located in the side wall of the compressor chamber 111 to reduce only a portion of the load of the compressor and the positioning of either of the bypass ports 118 and 126 may be varied as desired, as will be appreciated by those skilled in the art. Further, it may be desirable in some instances to utilize the bypass control valve 128 alone without the provision of a speed responsive bypass valve 119.

As a summary of operation, as may be illustrated with reference to FIGURE 7, at low speeds the valve 119 will remain closed so that no working fluid will be relieved through the relieving port 118 and the compressor piston will deliver a full charge of working fluid for each stroke. As the speed of the engine and the compressor are increased, the increase in pressure delivered by the oil pump 123 will increase the pressure within the bellows 121 to open the valve 119, bypassing the working fluid for a portion of the stroke of a piston thus reducing the load on the engine 137 which drives the compressor. When the engine 137 is rapidly accelerated or when it is heavily loaded, the reduction in vacuum in the intake manifold 139 will permit the spring 134 to overcome the negative pressure within the bellows 132 and open the valve 128 thus bypassing the entire fluid delivered by the working stroke of the piston 112 and removing the load of the compressor from the engine 137. As the vacuum again increases in the intake manifold, the valve 128 will be closed and the compressor will operate normally.

Thus it will be seen that I have provided an improved air conditioning system for an automotive vehicle which meets the objectives and advantages hereinabove set forth. The system incorporates a compressor which satisfactorily operates the air conditioning system at engine idle speeds and at low speeds and yet which does not have an excessive capacity and does not create an excessive load on the engine at cruising speeds and high road speeds. The system also automatically adapts to reduce the load on the engine during periods of acceleration for road passing or during periods of heavy engine loads. The air conditioning system and compressor thus operate satisfactorily over a wide range of operating conditions and yet do not burden the engine or unduly decrease efficiency.

The control of the compressor is obtained through simplified reliable control mechanisms which are capable of accurate and reliable response and which can be incorporated in a single compact unit and which requires either no connections or very simple connections to the engine.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In an air conditioning system for a vehicle driven by an internal combustion engine, a combination comprising a housing defining a compressor chamber therein with an inlet port and an outlet port, a piston member movable in the chamber for forcing fluid from said inlet port to said outlet port, means defining a first relieving port for relieving the compressor chamber for at least a portion of the stroke of the piston member in forcing fluid from the inlet port to the outlet port and accommodating a flow of fluid from the chamber, means defining a second relieving port for relieving the compressor chamber for at least a portion of the stroke of the piston member, a first control valve connected to said first relieving port, a second control valve connected to said second relieving port, a condenser connected to the compressor outlet port to receive refrigerating fluid therefrom, an evaporator connected to receive fluid from the compressor and connected to said inlet port, an oil pump driven by the compressor and having an output pressure which is a function of the compressor speed, first pressure responsive means connected to said first control valve and connected to be responsive to the net increase in oil pressure caused by said oil pump and said inlet port and opening the first control valve at a predetermined pressure increase, and a second pressure responsive means connected to said second control valve and connected to measure the pressure of the vacuum of the intake manifold of the engine and to close said second control valve during periods when a high vacuum is registered so that the output of the compressor will be reduced at high engine speeds and at low engine vacuum.

2. In an air conditioning system for an engine driven vehicle, a combination comprising a compressor driven at varying speeds by a vehicle engine having an inlet and a discharge, a condenser connected to receive fluid from the compressor, an evaporator connected to receive fluid from the condenser for cooling a space of the vehicle and to deliver refrigerating fluid to the compressor inlet, a compressor control means connected to the compressor for reducing the output of said compressor, means driven at a speed proportional to the compressor speed generating a first signal which is a function of the speed of operation of said compressor, means for generating a second signal which is a function of the load on the engine of the vehicle, first operating means connected to said compressor control means and operative to reduce the output of the compressor as a function of said first signal, and second operating means connected to said compressor control means and operative to reduce the output of the compressor as a function of said second signal.

3. A compressor comprising in combination means defining a compressor chamber having an inlet port and an outlet port, a piston member movable in the chamber for forcing fluid from said inlet port to said outlet port, means defining a relieving port for relieving the compressor chamber and accommodating a flow of fluid from the chamber, a control valve connected to said relieving port, a fluid pump driven at a speed proportional to the compressor speed and having a fluid discharge output which is a function of the speed of operation of the compressor, means responsive to the pump output, and valve operating means connected to said control valve and to said pump output responsive means and operative to open said valve at a predetermined maximum fluid pump output to reduce the fluid delivery of the piston member.

4. A compressor comprising a housing having a compressor chamber therein with an inlet port and an outlet port, a piston member movable within the chamber for receiving fluid from the inlet port and discharging fluid from the outlet port, means defining an intermediate port for relieving the compressor chamber and accommodating a flow of fluid from the chamber, a control valve connected to said intermediate port, a lubricating fluid pump driven with said compressor having a speed which is a function of compressor speed and a lubricating fluid output which is a function of pump speed, and a valve operating means responsive to the output of said lubricating pump and connected to said control valve and opening the valve at a predetermined maximum lubricating pump output to reduce the fluid delivery of the piston member.

5. A compressor comprising in combination means defining a compressor chamber having an inlet port and an outlet port, a piston member movable in the chamber for forcing fluid from said inlet port to said outlet port, means for reducing the output of said compressor to reduce the power input for driving the compressor, a lubricating fluid pump driven with said compressor having a speed which is a function of compressor speed and having an input substantially equal to compressor inlet pressure and an output which is a function of its speed, pump output responsive means connected to measure pump output pressure and compressor inlet pressure and responsive to the difference thereof to register net output of said lubricating pump, and operating means connected to said pump output responsive means and operative to reduce the output of the compressor as a function of said net pump output pressure.

6. In an air conditioning system, a compressor having an inlet and a discharge, a condenser connected to the discharge to receive fluid from the compressor, an evaporator connected to the compressor inlet to deliver fluid thereto and connected to receive fluid from the condenser, a compressor control means connected to the compressor for reducing the output of said compressor, a fluid pump having an inlet at the pressure of the evaporator driven with said compressor at a speed proportional thereto for generating a first signal which is a function of the speed of operation of the compressor, pressure responsive means connected to said evaporator for generating a second signal which is a function of evaporator pressure, and operating means connected to said compressor control means and said fluid pump and said evaporator and reducing the output of the compressor as a function of the difference between said first signal and said second signal.

7. The method of controlling the output of a compressor in an air conditioning system having a lubricating pump with an intake at the pressure of the compressor intake by reducing compressor output to reduce the power requirements at higher speeds which comprises, generating a first pressure signal which is a function of lubricating pump output pressure, generating a second signal which is a function of intake pressure of the compressor, and relieving the discharge of the pump in response to an increase in the difference between said first and second signals with an increase in said first signal.

8. The method of controlling the output of a compressor having a lubricating pump driven at a function of compressor speed and having a compressor chamber with a piston movable therein in an intake and a discharge stroke to reduce the power requirement at higher speeds which comprises generating a first signal which is a function of lubricating pump output pressure, generating a second signal which is a function of the intake pressure of the lubricating pump, and bleeding off the discharge fluid from the compressor for the first portion of the discharge stroke in response to an increase in the difference between said first and second signals with an increase of said first signal.

9. A compressor mechanism for an air conditioner in a power driven vehicle comprising a housing with a compressor chamber therein having an inlet port and an outlet port, a piston member movable in the chamber for forcing fluid from said inlet port to said outlet port to deliver refrigerating fluid to a condenser, means defining a relieving port for relieving the compressor chamber and accommodating a flow of fluid from the chamber, a control valve connected to said relieving port, pressure responsive means for providing a signal which is a function of the intake manifold vacuum of an engine for driving the vehicle, and valve operating means connected to said control valve and to said pressure responsive means operative to open said valve at a predetermined minimum manifold vacuum and to close said valve at higher manifold vacuums to reduce the fluid delivered by said piston member at loads at which said manifold vacuums are below said predetermined vacuum.

10. A compressor comprising in combination means for compressing a working fluid driven at varying speeds, means for controlling the output of said compressing means independent of its speed, and means driven at a speed proportional to the compressing means connected to said controlling means and operative to reduce the output of the compressing means at a predetermined speed so that the power required for operation of the compressing means is reduced at said predetermined speed.

11. A compressor comprising a housing with a compressor chamber therein having an inlet port and an outlet port, a piston member movable in the chamber for forcing fluid from said inlet port to said outlet port, means defining a relieving port communicating with said chamber for relieving the fluid from the chamber and reducing the compressor output, a relieving valve positioned to control flow through said relieving port, a lubricating fluid pump driven with said compressor at a speed proportional to the compressor and having an inlet at compressor inlet pressure, a valve casing defining a first pressure chamber connected to lubricating fluid pump discharge pressure and a second pressure chamber connected to the pressure of said compressor chamber inlet port, and a movable valve operating member connected to said valve and having surfaces exposed to said pressure chambers to operate said valve as a function of the difference of pressures between said pressure chambers and to open the valve at a maximum operating speed of the compressor.

12. A valve mechanism for controlling the output of a compressor for an air conditioning system or the like comprising in combination a valve casing defining a first pressure chamber and a second pressure chamber therein, means for generating a signal pressure independent of the pressure of fluid delivered by the compressor which varies as a function of the speed of a compressor, means defining a first inlet port communicating with said first chamber and connected to said pressure signal means, means defining a second inlet port communicating with said second chamber for connection to the inlet pressure of the compressor, a movable member between said chambers movable in response to pressure differentials between said chambers, and a valve for by-passing fluid delivered by the compressor to reduce power input requirements and being connected to said movable member, said movable member moving the valve to open position to increase fluid by-pass in response to pressure increase in said first chamber, and moving the valve toward closed position to decrease fluid by-pass in response to pressure increase in said second chamber.

13. A controlled compressor for an air conditioning mechanism or the like in a power driven vehicle comprising a compressor for delivering working fluid and adapted to be driven by power means for driving said vehicle, means for controlling the output of said compressor, and means responsive to the load on said vehicle connected to said output controlling means and after a predetermined vehicle load is reached reducing the compressor output from its full output at operating speed as a function of further increase of load on the vehicle.

References Cited in the file of this patent
UNITED STATES PATENTS

| | | |
|---|---|---|
| 1,983,550 | Lee | Dec. 11, 1934 |
| 2,036,846 | Addinger | Apr. 7, 1936 |
| 2,123,497 | Buchanan | July 12, 1938 |
| 2,130,995 | Henney | Sept. 20, 1938 |
| 2,165,741 | Wolfert | July 11, 1939 |
| 2,187,397 | Goggins | Jan. 16, 1940 |
| 2,216,690 | Madden | Oct. 1, 1940 |
| 2,247,449 | Neeson | July 1, 1941 |
| 2,254,593 | Eisinger et al. | Sept. 2, 1941 |
| 2,328,824 | McCormack et al. | Sept. 7, 1943 |
| 2,555,005 | Warneke | May 29, 1951 |
| 2,715,992 | Wilson | Aug. 23, 1955 |
| 2,807,148 | Jacobs | Sept. 24, 1957 |
| 2,920,812 | Courtney | Jan. 12, 1960 |